US010673967B2

(12) United States Patent
Anders

(10) Patent No.: US 10,673,967 B2
(45) Date of Patent: Jun. 2, 2020

(54) PERSONALIZED WEBSITE MODIFICATION BASED ON ONLINE USER ACTIVITY

(71) Applicant: International Business Machines Corporation, Armonk, NY (US)

(72) Inventor: Kelley Anders, East New Market, MD (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/978,607

(22) Filed: May 14, 2018

(65) Prior Publication Data

US 2019/0349439 A1 Nov. 14, 2019

(51) Int. Cl.
| | |
|---|---|
| *G06F 3/0482* | (2013.01) |
| *H04L 29/08* | (2006.01) |
| *G06Q 30/06* | (2012.01) |
| *G06N 20/00* | (2019.01) |
| *G06F 16/955* | (2019.01) |
| *G06Q 50/00* | (2012.01) |

(52) U.S. Cl.
CPC ............ *H04L 67/22* (2013.01); *G06F 3/0482* (2013.01); *G06F 16/955* (2019.01); *G06N 20/00* (2019.01); *G06Q 30/0641* (2013.01); *G06Q 50/01* (2013.01)

(58) Field of Classification Search
CPC ...... H04N 21/81; H04N 21/45; G06F 3/0481; G06F 3/0484; G06F 3/0488; G06F 16/955; G06F 3/0482; G06Q 99/00; G06Q 30/0641; G06Q 50/01; G06N 20/00; H04L 67/22
See application file for complete search history.

(56) References Cited

U.S. PATENT DOCUMENTS

| | | | | |
|---|---|---|---|---|
| 8,954,346 | B1 * | 2/2015 | Walker ................. | H04N 21/435 386/249 |
| 9,760,930 | B1 * | 9/2017 | Sarmento ........... | G06Q 30/0625 |
| 2002/0147977 | A1 * | 10/2002 | Hammett ............. | H04N 5/4401 725/47 |
| 2008/0281610 | A1 * | 11/2008 | Yoshida ................ | G06Q 30/02 705/1.1 |
| 2009/0144066 | A1 * | 6/2009 | Van Luchene ....... | G06Q 10/067 705/348 |

(Continued)

FOREIGN PATENT DOCUMENTS

CN 102722501 B * 7/2015

*Primary Examiner* — Steven P Sax
(74) *Attorney, Agent, or Firm* — Schmeiser, Olsen & Watts, LLP; Isaac Gooshaw

(57) ABSTRACT

A system and method for altering a website from a default appearance to a personalized appearance includes aggregating user-specific information based on an online user activity across a plurality of platforms, analyzing the aggregated user-specific information based on the online user activity to determine a user-preferred term for describing a category of an object, detecting a default term used to describe the category of the object on the default appearance of the website, in response to a determination that a user has accessed the website, and superimposing the user-preferred term on the website at a location of the default term on the website, such that the website is altered to display the user-preferred term to the user instead of the default term for the category of the object.

17 Claims, 11 Drawing Sheets

(56) References Cited

U.S. PATENT DOCUMENTS

| | | | |
|---|---|---|---|
| 2009/0165134 A1* | 6/2009 | Flake | G06F 16/957 726/22 |
| 2009/0222551 A1* | 9/2009 | Neely | G06F 16/951 709/224 |
| 2009/0327863 A1 | 12/2009 | Holt et al. | |
| 2010/0138370 A1 | 6/2010 | Wu et al. | |
| 2011/0066484 A1* | 3/2011 | Cha | G06Q 30/02 705/14.23 |
| 2011/0137895 A1* | 6/2011 | Petrou | H04W 4/02 707/723 |
| 2013/0028400 A1* | 1/2013 | Fix | G09B 5/12 379/88.13 |
| 2013/0030804 A1* | 1/2013 | Zavaliagkos | G10L 15/26 704/235 |
| 2013/0042188 A1* | 2/2013 | Dobronsky | G06F 3/04817 715/760 |
| 2014/0075004 A1* | 3/2014 | Van Dusen | H04L 41/04 709/223 |
| 2014/0172627 A1* | 6/2014 | Levy | G06Q 30/0631 705/26.7 |
| 2014/0244646 A1* | 8/2014 | Bao | G06F 16/954 707/737 |
| 2014/0331127 A1* | 11/2014 | Chang | G06F 40/166 715/271 |
| 2015/0024351 A1* | 1/2015 | Landwehr | G09B 5/06 434/169 |
| 2015/0160792 A1* | 6/2015 | Yang | G06F 3/0482 715/810 |
| 2015/0339754 A1* | 11/2015 | Bloem | G06Q 30/0631 705/26.7 |
| 2016/0071143 A1 | 3/2016 | Pokorney et al. | |
| 2016/0225022 A1* | 8/2016 | Kurapati | G06F 16/958 |
| 2017/0034305 A1* | 2/2017 | Blevins | H04L 67/42 |
| 2017/0061502 A1* | 3/2017 | Zhang | G06Q 30/0275 |
| 2017/0238067 A1* | 8/2017 | Sharma | H04N 21/812 725/14 |
| 2018/0137540 A1* | 5/2018 | Nightingale | G06Q 30/0269 |
| 2018/0173896 A1* | 6/2018 | Arneson | G06F 21/44 |
| 2018/0225341 A1* | 8/2018 | Merg | G06F 7/08 |
| 2019/0042556 A1* | 2/2019 | Anders | G06F 17/274 |
| 2019/0115021 A1 | 4/2019 | Van Den Berg | G10L 15/22 |
| 2019/0266291 A1* | 8/2019 | Kummamuru | G06F 16/9535 |

* cited by examiner

PERSONALIZED WEBSITE MODIFICATION BASED ON ONLINE USER ACTIVITY

TECHNICAL FIELD

The present invention relates to systems and methods for personalized website experiences, and more specifically the embodiments of a website personalization system for altering a website from a default appearance to a personalized appearance.

BACKGROUND

Currently, websites have a default appearance or layout based on a design used to create the website. Advertisements may be rendered on the website that pertain to previous user online activity, but those advertisements are rendered around the default appearance/layout of the website. The advertisements and suggestions displayed on the screen, in addition to the default layout of popular retail and e-commerce menus can overwhelm a user visiting the website.

SUMMARY

An embodiment of the present invention relates to a method, and associated computer system and computer program product, for altering a website from a default appearance to a personalized appearance. A processor of a computing system aggregates user-specific information based on an online user activity across a plurality of platforms. The aggregated user-specific information based on the online user activity is analyzed to determine a user-preferred term for describing a category of an object. A default term used to describe the category of the object is detected on the default appearance of the website, in response to a determination that a user has accessed the website. The user-preferred term is superimposed on the website at a location of the default term on the website, such that the website is altered to display the user-preferred term to the user instead of the default term for the category of the object.

DETAILED DESCRIPTION

Currently, shopping websites offer no personalization by changing, altering, or modifying the default layout of the website to personalize the shopping experience for the user, in a way that is tailored to how the user searches for categories, goods, services, objects, etc. Thus, there is a need for a website personalization system for altering a website from a default appearance to a personalized appearance. Embodiments of the present invention may aggregate data from multiple sites visited by a user, as well as social media engagements, interactions with various software and mobile applications to create a personalized catalog for the user. The personalized catalog or user-preferred terms and/or layouts may then be superimposed over whatever website the user is accessing to see how the user's usual shopping patterns align with what is offered on the given website.

Figure 1:
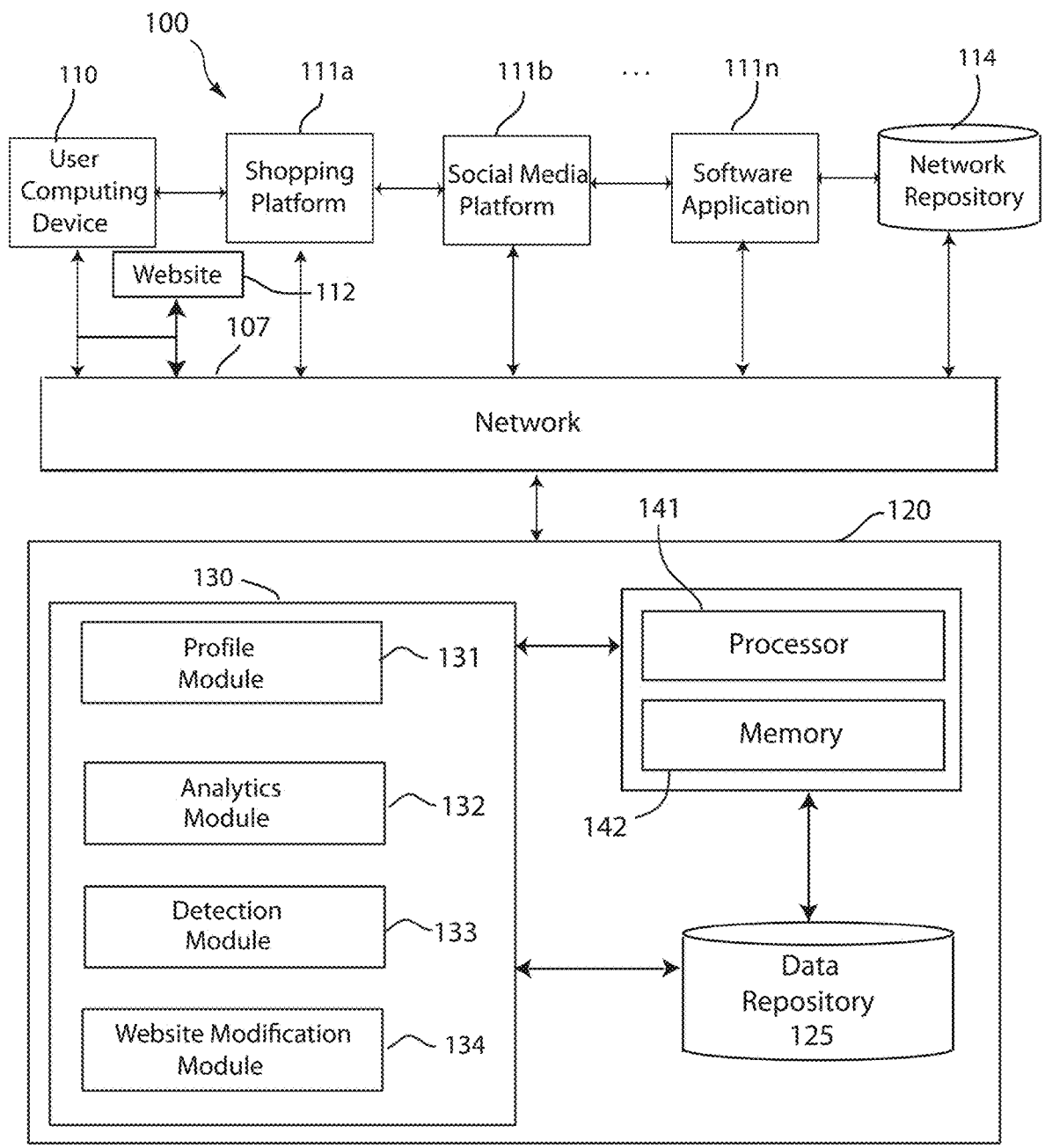
FIG. 1 depicts a block diagram of a website personalization system, in accordance with embodiments of the present invention.

Referring to the drawings, FIG. 1 depicts a block diagram of a website personalization system 100, in accordance with embodiments of the present invention. Embodiments of the website personalization system 100 may be a system for altering a website from a default appearance to a personalized appearance, wherein a website is visually altered, modified, adjusted, changed, and the like, to display terms, layouts, arrangements, etc. that are preferred by the user or used by the user to describe or otherwise refer to category of object, good, service, etc. Embodiments of the website personalization system 100 may be useful for personalizing a shopping website or other website to the user, to enhance an experience navigating through the website and locating goods, objects, etc. for purchase. For example, the website personalization system 100 may tailor any given website to the user while the default design of the website remains unchanged for other users. In other words, the website personalization system 100 may allow website modification to be performed at the individualized user level, without requiring large e-commerce websites to handle the modifications on a large scale. Examples of website that can be altered by the website personalization system 100 may be a shopping website, a retailer website, an e-commerce platform, a home improvement store website, a department store website, a virtual store associated with mobile phones, video game consoles, streaming devices, and the like.

Embodiments of the website personalization system 100 may be a personalized e-commerce portal system, an individualized shopping engine, a website modification system, a website altering system for personalized shopping experience, a user tailored e-commerce system, and the like. Embodiments of the website personalization system 100 may include a computing system 120. Embodiments of the computing system 120 may be a computer system, a computer, a server, one or more servers, a backend computing system, and the like.

Furthermore, embodiments of website personalization system 100 may include a user computing device 110 and a plurality of platforms 111a, 111b . . . 111n utilized by a user, and a website 112 that are communicatively coupled to the computing system 120 over a network 107. For instance, information/data may be transmitted to and/or received from the user computing device 110, the plurality of platforms 111a . . . 111n, and the website 112 over a network 107. A network 107 may be the cloud. Further embodiments of network 107 may refer to a group of two or more computer systems linked together. Network 107 may be any type of computer network known by individuals skilled in the art. Examples of network 107 may include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA network or a mobile communications data network. The architecture of the network 107 may be a peer-to-peer network in some embodiments, wherein in other embodiments, the network 107 may be organized as a client/server architecture.

In some embodiments, the network 107 may further comprise, in addition to the computing system 120, a connection to one or more network-accessible knowledge bases 114, which are network repositories containing information of the user, product information, catalogs, social media platform activity, location information, user activity, user preferences, network repositories or other systems connected to the network 107 that may be considered nodes of the network 107. In some embodiments, where the computing system 120 or network repositories allocate resources to be used by the other nodes of the network 107, the computing system 120 and network-accessible knowledge bases 114 may be referred to as servers.

The network-accessible knowledge bases 114 may be a data collection area on the network 107 which may back up and save all the data transmitted back and forth between the nodes of the network 107. For example, the network repository may be a data center saving and cataloging user online activity data, user data, location data, user preference data, images, layouts, appearances, and the like, to generate both historical and predictive reports regarding a particular user or a particular tailored website, and the like. In some embodiments, a data collection center housing the network-accessible knowledge bases 114 may include an analytic module capable of analyzing each piece of data being stored by the network-accessible knowledge bases 114. Further, the computing system 120 may be integrated with or as a part of the data collection center housing the network-accessible knowledge bases 114. In some alternative embodiments, the network-accessible knowledge bases 114 may be a local repository that is connected to the computing system 120.

Embodiments of the user computing device 110 may be a computing device, a computer, a desktop computer, a cell phone, a mobile computing device, a tablet computer, a laptop computer, a wearable computing device, a smartwatch, and the like. The user computing device 110 may include hardware functionality such as a speaker for emitting a sound, a vibration motor for creating vibrations, a display for displaying images, videos, pictorial sequences, etc., a light emitting element for emitting a light, a receiver for receiving communications, a transmitter for transmitting signals, and other similar features and hardware of a computer, smartphone, smartwatch, cell phone, tablet computer, and the like.

Referring still to FIG. 1, embodiments of the website personalization system 100 may include a plurality of platforms 111a . . . 111n. Embodiments of the plurality of platforms 111a . . . 111n may be communicatively coupled to the computing system 120 over network 107. Embodiments of the plurality of platforms 111a . . . 111n of the website personalization system 100 depicted in FIG. 1 may be one or more services, engines, platforms, systems, web crawler, web search engine, one or more websites, applications, one or more social media platforms, shopping websites, text messaging applications, browser bookmarks, a virtual assistant, a dictation application, email applications, databases, storage devices, repositories, servers, computers, engines, and the like, that may be accessed by the user over a network, such as network 107. Embodiments of the platforms 111a . . . 111n may be accessed, used, visited, etc. by the user for various activities, including shopping, posting to social media, performing web searches, earning rewards, generating coupons or rebates, planning an event, generating a shopping list, rating goods and services, emailing, text messaging, creating favorites (e.g. favorite websites), and the like. The platforms 111a . . . 111n may be accessed or may share a communication link over network 107, and may be managed and/or controlled by a third party.

Embodiments of website 112 may be a website accessible by the user over network 107, via the user computing device 110. The website 112 may be hosted, operated, and controlled by a third party, comprising one or more back end servers servicing the website 112. Exemplary embodiments of the website 112 may be a shopping website, a retailer website, an e-commerce platform, a home improvement store website, a department store website, a virtual store associated with mobile phones, video game consoles, streaming devices, and the like. The website 112 may have a default appearance. For example, the website 112 may have a default or generic appearance, layout, order and arrangement, menu, text, content, default terms to describe a category of an object or good, etc. which is displayed and visible to any user accessing the website 112. The default or generic appearance can be changed over time by website developer, but these types of changes are wholesale changes that generically and wholly apply to the website 112, which are visible to anyone visiting the website 112. Changing the appearance of the website 112 may require detailed and time-consuming code changes to effectuate site-wide changes. Thus, embodiments of the website personalization system 100 may save those efforts and resources by individualizing the website experience by altering the website in accordance with embodiments of the present invention as described infra.

Furthermore, embodiments of the computing system 120 may be equipped with a memory device 142 which may store various data/information/code, and a processor 141 for implementing the tasks associated with the website personalization system 100. In some embodiments, a website modification application 130 may be loaded in the memory device 142 of the computing system 120. Embodiments of the website modification application 130 may be an interface, an application, a program, a module, or a combination of modules. In an exemplary embodiment, the website modification application 130 may be a software application running on one or more back end servers associated with the website 112 or otherwise in communication with the website 112 servers, servicing a user computer device 110 and/or altering website 112, wherein a user interface portion of the software application also run on the user computing device 110.

The website modification application 130 of the computing system 120 may include a profile module 131, an analytics module 132, a detection module 133, and a website modification module 134. A "module" may refer to a hardware-based module, software-based module or a module may be a combination of hardware and software. Embodiments of hardware-based modules may include self-contained components such as chipsets, specialized circuitry and one or more memory devices, while a software-based module may be part of a program code or linked to the program code containing specific programmed instructions, which may be loaded in the memory device of the computing system 120. A module (whether hardware, software, or a combination thereof) may be designed to implement or execute one or more particular functions or routines.

Embodiments of the profile module 131 may include one or more components of hardware and/or software program code for aggregating user-specific information based on an online user activity across a plurality of platforms. For instance, embodiments of the profile module 131 may aggregate or otherwise collect user-specific information, such as preferred descriptors, often used terms for various categories of goods, shopping preferences, hobbies, interests, purchasing patterns, spending limits, favorite items, favorite websites, local dialect for various items, goods, types of goods, etc., likes, dislikes, affiliations, and the like. The user-specific information may be collected, gathered, or otherwise obtained by monitoring, evaluating, analyzing, etc. a user's online activity. The user's online may be a shopping history, a browsing history, social media engagements, an email history, a social media activity on one or more social media platforms, a software application interaction (e.g. using a coupon application), and the like. Embodiments of the profile module 131 may obtain the user-specific information based on the user's online activity by monitoring activity on the user computing device 110 and the plurality of platforms 111*a*, 111*b* . . . 111*n*. For instance, embodiments of the profile module 131 may detect that the user is discussing a particular item (e.g. jewelry, jerseys, clothes, etc.) on one or more social media platforms, or blogs, using user-preferred terms for the item. In one embodiment, the user may use a browser on the user computing device 110 to use a search engine to search the Internet for an item using various user search terms input by the user, which may be detected and collected by the profile module 131. In another exemplary embodiment, the user may be searching for a product on a particular website, which may be detected and collected by the profile module 131. In another embodiment, the profile module 131 may detect a user's activity on one or more social media platforms (e.g. a user posting about the desire to purchase an item). In yet another embodiment, the profile module 131 may detect user searching activity from a combination of sources and methods to determine that the user is discussing an item. Further, embodiments of the profile module 131 may detect and collect data/information regarding a user's use of a software application. For example, the user may use a coupon application for an item, which may provide additional user-specific information. Embodiments of the profile module 131 may aggregate the user-specific information collected by various means as described above.

Referring still to FIG. 1 embodiments of the computing system 120 may include an analytics module 132. Embodiments of the analytics module 132 may include one or more components of hardware and/or software program code for analyzing the aggregated user-specific information based on the online user activity to determine a user-preferred term for describing a category of an object. For instance, the analytics module 132 may analyze, assess, evaluate, process, etc. the user-specific information to determine terms, descriptors, words, keywords, search terms, or other words used by the user to describe or otherwise refer to objects, which may be different than the terms, words, etc. used by various shopping websites, such as website 112 to categorize the object. Embodiments of the analytics module 132 may analyze the user-specific information input into the platforms 111*a*, 111*b* . . . 111*n*. The analytics module 132 may ascertain a context of the user-input content to determine whether the user is using a particular term to refer to an object, good, etc. The content shared, input, uploaded, or otherwise posted on the platforms 111*a*, 111*b* . . . 111*n* may be photographs, videos, search queries, comments made on other contacts' pages, text-based posts made to the social contact's own social media page, text messages, product reviews, and the like. The user-input content may be analyzed, parsed, scanned, searched, inspected, etc. for a context that correlates or otherwise relates to or is associated with an object the user has purchased, browsed, or searched for previously on a shopping platform 111*a*. In an exemplary embodiment, the analytics module 132 may utilize a natural language technique to determine keywords, words, terms, etc. used by user to input into the platforms 111*a*, 111*b* . . . 111*n*, and then examine the determined keywords, words, terms, etc. with known keywords that may be relatable with the topic, object, a product, location, service, service provider, etc., currently used by the website 112. In another embodiment, the analytics module 132 may use a combination of natural language techniques, cognitive applications/engines, and visual recognition engines to determine a context of the user-input content available on the platforms 111*a*, 111*b* . . . 111*n*. Embodiments of the analytics module 132 may perform a machine learning technique to the aggregated user-specific information to learn how the user describes categories, objects, goods, etc. over time, based on the user online activity across multiple platforms 111*a*, 111*b* . . . 111*n*.

As an example, a user may input the "throwbacks" when searching for new athletic jerseys on a search engine using a browser on the user computing device 110, and may also "like" a social media page dedicated to "throwback" jerseys. Thus, the analytics module 132 may conclude that the user is interested in buying jerseys of past players, but refers to the older jerseys as "throwbacks." In another embodiment, the user may use a messaging application to message with other users, and the user may consistently use the term "baubles" to refer to jewelry. In other embodiments, the user may often use the term "duds" when using a search engine to search for deals related to clothes or clothing. Embodiments of the analytics module 132 may determine that the user-preferred term for jerseys is "throwbacks", the user-preferred term for jewelry is "baubles," and the user-preferred term for clothes is "duds."

Additionally, embodiments of the analytics module 132 may determine what a user-preferred layout for viewing/shopping, based on the collected user-specific information. As an example, the analytics module 132 may analyze a social media platform 111*b* of the user, and notice that the user enjoys posting the user's grocery list, which is almost always broken down by the different meals of the day (e.g. breakfast, lunch, dinner, dessert), and referred to as "My Food." In addition, the analytics module 132 may analyze a user activity of a shopping list application loaded on the user computing device 110, in which the user titles the user's list as "food to get" and organizes the food items the user needs to purchase by the different meals of the day. Thus, embodiments of the analytics module 132 may determine that the user prefers the layout, presentation, organization, of groceries to be food items for each meal of the day.

Figure 2:
FIG. 2 depicts a default appearance of a website, including a number of default terms for a category of good, in accordance with embodiments of the present invention.

Embodiments of the computing system 120 may include a detection module 133. Embodiments of the detection module 133 may include one or more components of hardware and/or software program for detecting a default term used to describe the category of the object on the default appearance of the website 112, in response to a determination that a user has accessed the website 112. For instance, a default term used to categorize, refer to, or describe a good, item, product, etc. may be detected by scraping the website for keywords that are relevant to the user-preferred term. The computing system 120 may scrape and/or scan the webpage of the website 112 accessed by the user for words, terms, descriptors, etc. used by the default website 112 that may be replaced by user-preferred terms. FIG. 2 depicts a default appearance of a website 112, including a number of default terms for a category of good, in accordance with embodiments of the present invention. Embodiments of the default appearance of the website 112 may be an appearance, layout, presentation, configuration, that displays text referring to various categories of objects, goods, products, services, etc. The default appearance of the website 112 may be what the general public sees when accessing the website 112. As can be seen in FIG. 2, the default layout of the website 112 includes a menu bar having default text, terms, words referring to objects and/or categories of objects, such as "Clothes, "Toys," "Home Improvement", "Electronics," "Jewelry," "Kitchen and Bath," "Lawn and Garden," "Sporting Goods," "Automotive," and "Groceries." If the "Clothes" menu bar text is selected, a submenu may appear having default text, terms, words, referring to objects and/or categories of objects, such as "Shirts," "Pants," "Hats," and "Jerseys." The default appearance of the website may also include a special offer "20% OFF SALE ON JEWELRY!!". Users accessing the website 112 without the website modification application 130 may see the default appearance of website 112, as shown in FIG. 2.

Figure 3:
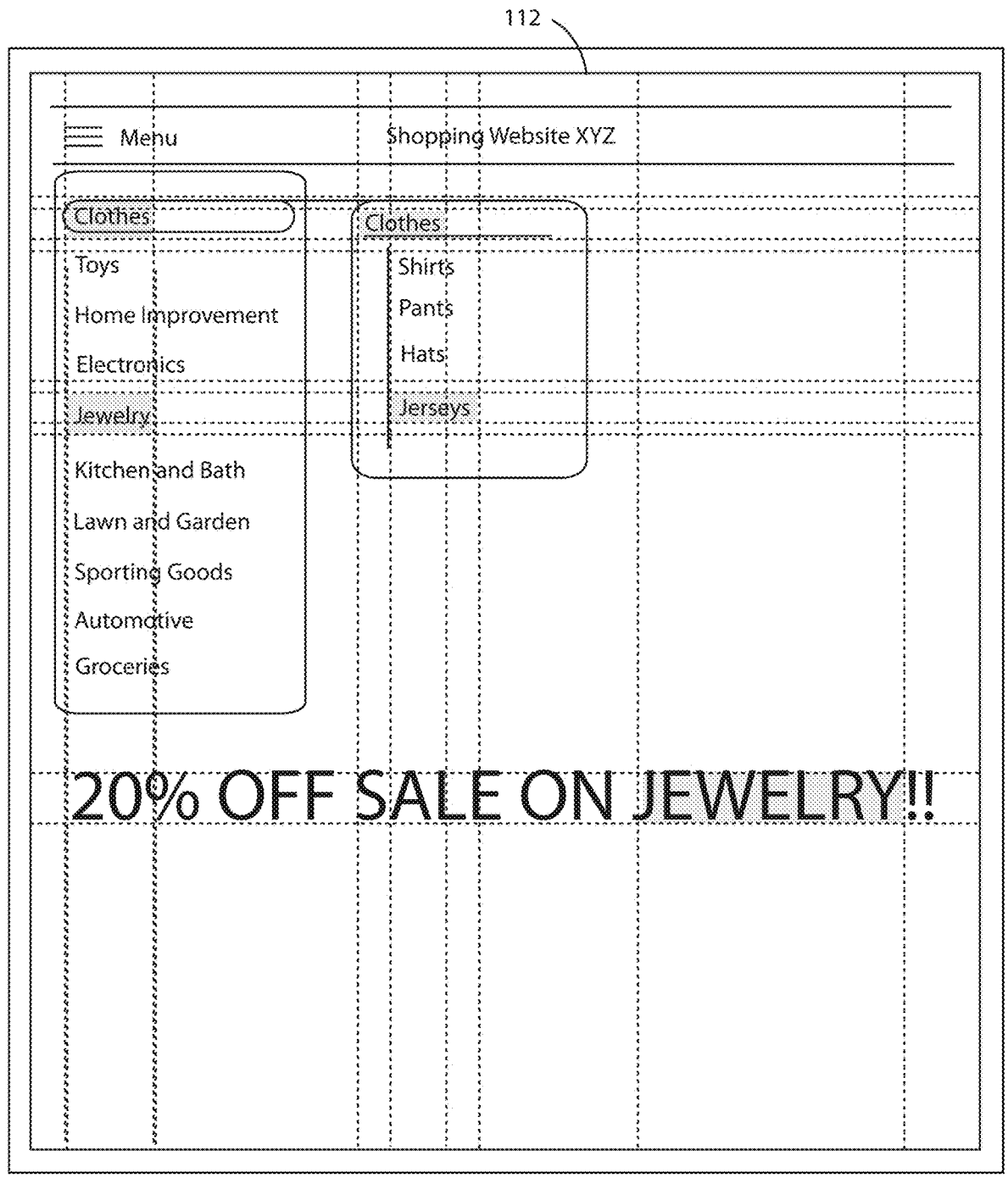
FIG. 3 depicts a detection of default terms on the default appearance of the website of FIG. 2, which are relevant to known user-preferred terms, in accordance with embodiments of the present invention.

Turning now to FIG. 3, which depicts a detection of default terms on the default appearance of the website 112 of FIG. 2, which are relevant to known user-preferred terms, in accordance with embodiments of the present invention. Embodiments of the detection module 133 may detect the default terms by scanning, scraping, or otherwise searching the webpage of the website 112 for text, terms, keywords, descriptors, etc. that may be replaced by user-specific terms. For instance, the detection module 133 may locate or otherwise identify a location or a position of one or more default terms on the webpage. By scanning the webpage, the detection module 133 may determine a precise location or positioning of the default term being displayed on the webpage of the website 112. In the example depicted by FIG. 3, a positioning of the default term "Clothes" has been identified in two locations, which may be replaceable by the user-preferred term "duds." A positioning of the default term "Jewelry" has also been identified in two locations, which may be replaceable by the user-preferred term "baubles." A positioning of the default term "Jerseys" has been identified in a single location in a submenu bar, which may be replaceable by the user-preferred term "throwbacks." In an exemplary embodiment, the location of the default term(s) as they exist on the website 112 can be stored as a path. For example, the detection module 133 may then determine a directory and eventually a path name associated with the default term being displayed, at that location on the website 112. The paths may be a CSS path or X path. The path name may then be stored as the path for each detected default term, which allows a masking tool or superimposing tool to know the precise location where masking and/or superimposing of text may occur on the particular website 112. The path may be stored locally on the computing system 120 or may be stored on a remote server or other computer readable storage device coupled to the computing system 120.

Referring back to FIG. 1, embodiments of the computing system 120 may also include a website modification module 134. Embodiments of the website modification module 134 may include one or more components of hardware and/or software program for superimposing, adding, inserting, displaying etc. the user-preferred term on the website 112 at a location of the default term on the website 112, such that the website 112 is altered to display the user-preferred term to the user instead of the default term for the category of the object. For instance, the website modification module 134 may modify, re-render, adjust, alter, change, affect, etc. the website 112 so that the user-preferred term is visible on a display rather than the previous default term. In an exemplary embodiment, the website modification module 134 may superimpose the user-preferred term onto the webpage, using the stored path to locate a precise position to insert, add, superimpose, or otherwise display the user-preferred term. In further embodiments, embodiments of the website modification module 134 may mask the default term using a masking tool, and then overlaying the user-preferred term onto the masked location, so that user only sees the user-preferred term at the location of the website that previously displayed the default term.

Figure 4:
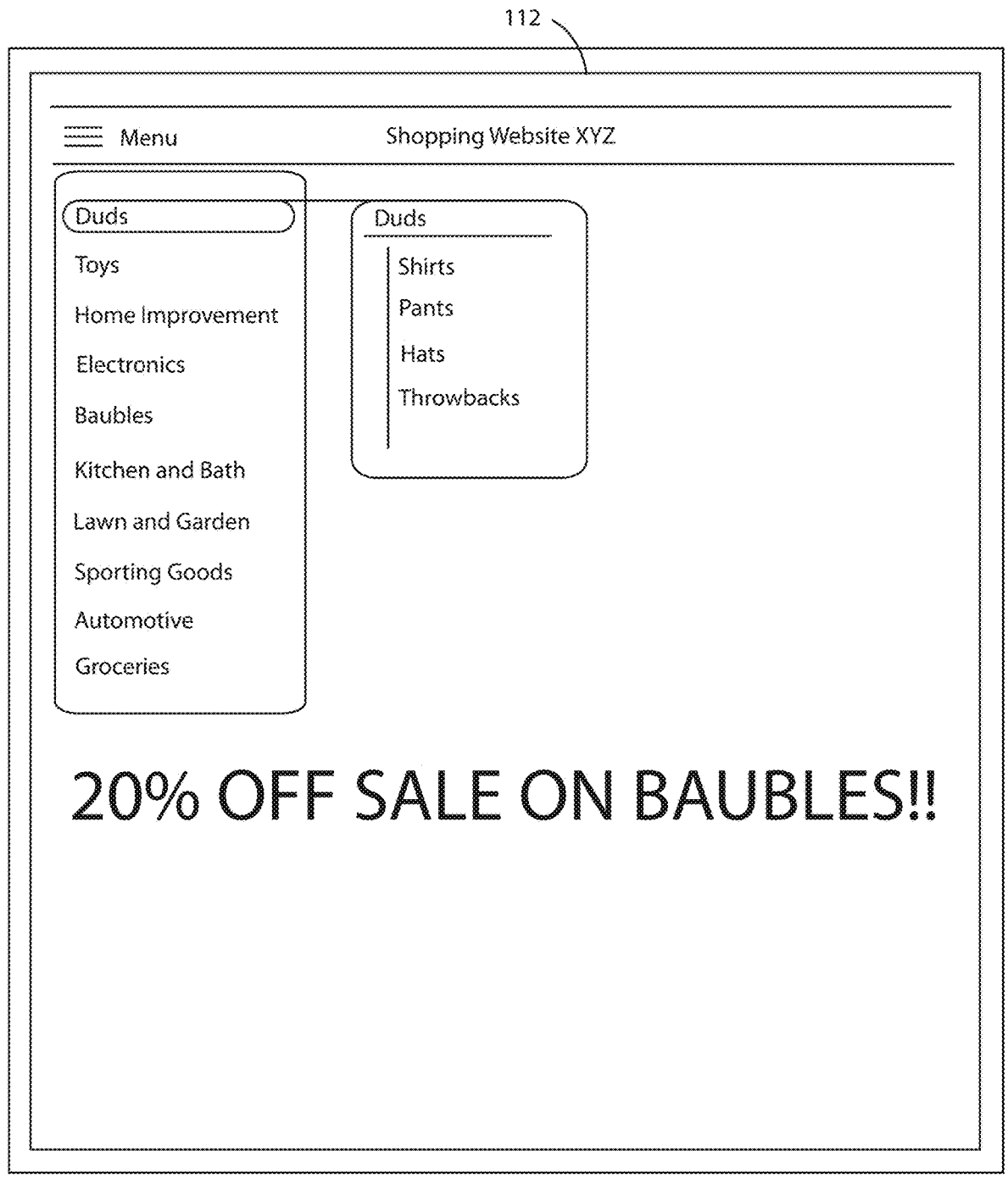
FIG. 4 depicts a personalized appearance of the website of FIG. 2, in accordance with embodiments of the present invention.

FIG. 4 depicts a personalized appearance of the website of FIG. 2, in accordance with embodiments of the present invention. Embodiments of the personalized appearance of the website 112 may be an appearance, layout, presentation, configuration, that displays text referring to various categories of objects, goods, products, services, etc. using terms, descriptors, words, text, etc. that the user prefers, regularly used, easily recognizes and the like, discovered by analyzing the user-specific information gathered from user online activity. The personalized appearance of the website 112 has been changed so the user, when the user accessed the website, sees the user-preferred terms, and not the default terms. In FIG. 4, the website 112 has been altered such that the menu bar of website 112 includes a user-preferred term "Duds" instead of "Clothes, "Baubles" instead of "Jewelry", and "Throwbacks" instead of "jerseys." Thus, the website 112 is custom modified only for the individualized user, wherein actual displayed text is unique to the individual user. Some default terms, such as "Toys" and "Home Improvement" may remain unchanged to the user, if, for example, the computing system 120 does not yet have user-preferred terms associated with those default terms. However, the computing system 120 may continuously monitor the online user activity to further learn and develop new user-preferred terms.

Figure 5:
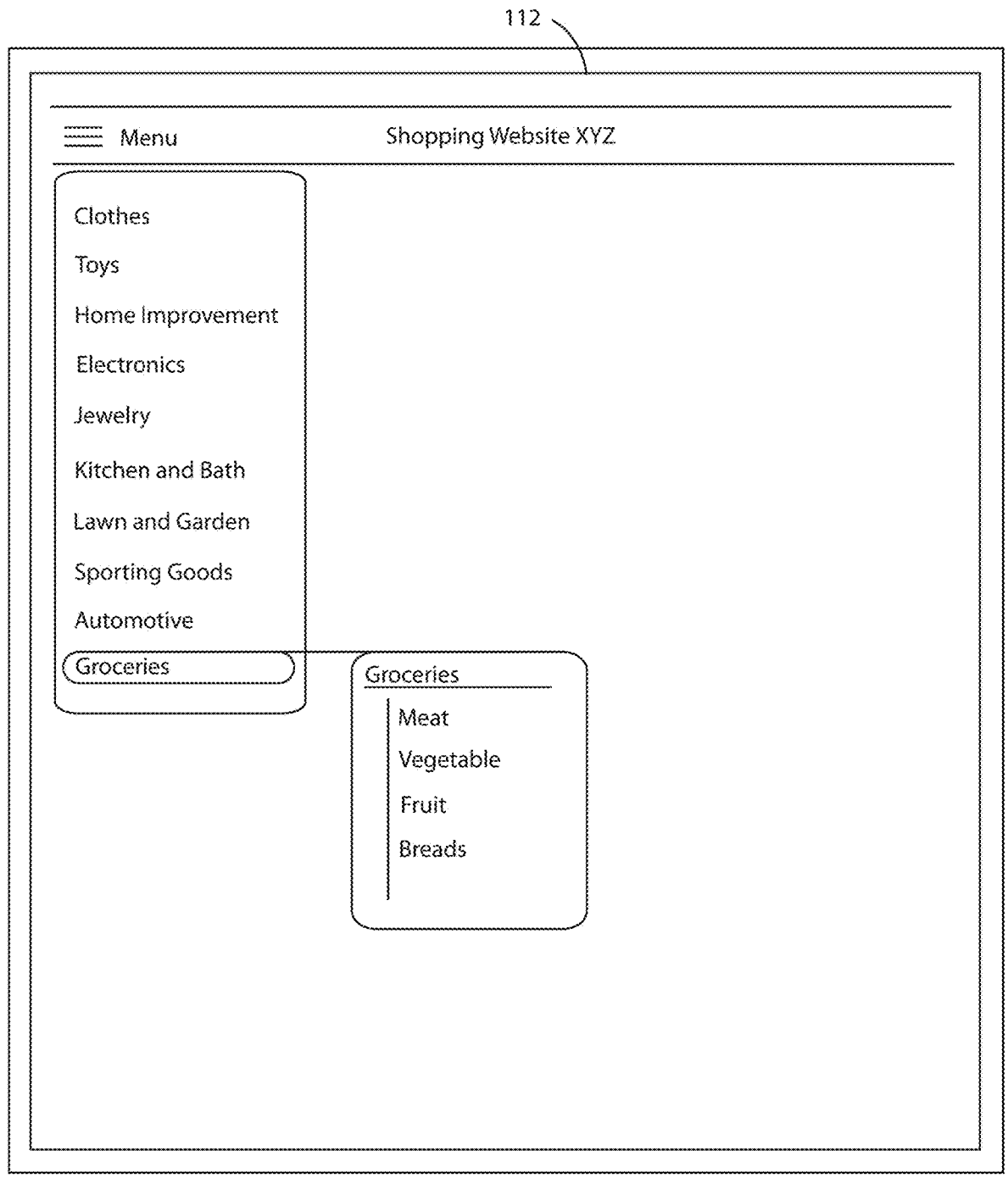
FIG. 5 depicts a default appearance of a website, including a default layout for a category of good, in accordance with embodiments of the present invention.

Moreover, embodiments of the website modification module 134 may modify, change, alter, etc. the website 112 to present a user-preferred layout for viewing/shopping, based on the collected user-specific information. FIG. 5 depicts a default appearance of a website, including a default layout for a category of good, in accordance with embodiments of the present invention. Embodiments of the default appearance of the website 112 may be an appearance, layout, presentation, configuration, of the default website 112 that displays text organizing a category of good. In FIG. 5, the default presentation of groceries in the submenu bar "Groceries" is categorized by types of food, such as "Meat," "Vegetable," "Fruit," and "Breads."

Figure 6:
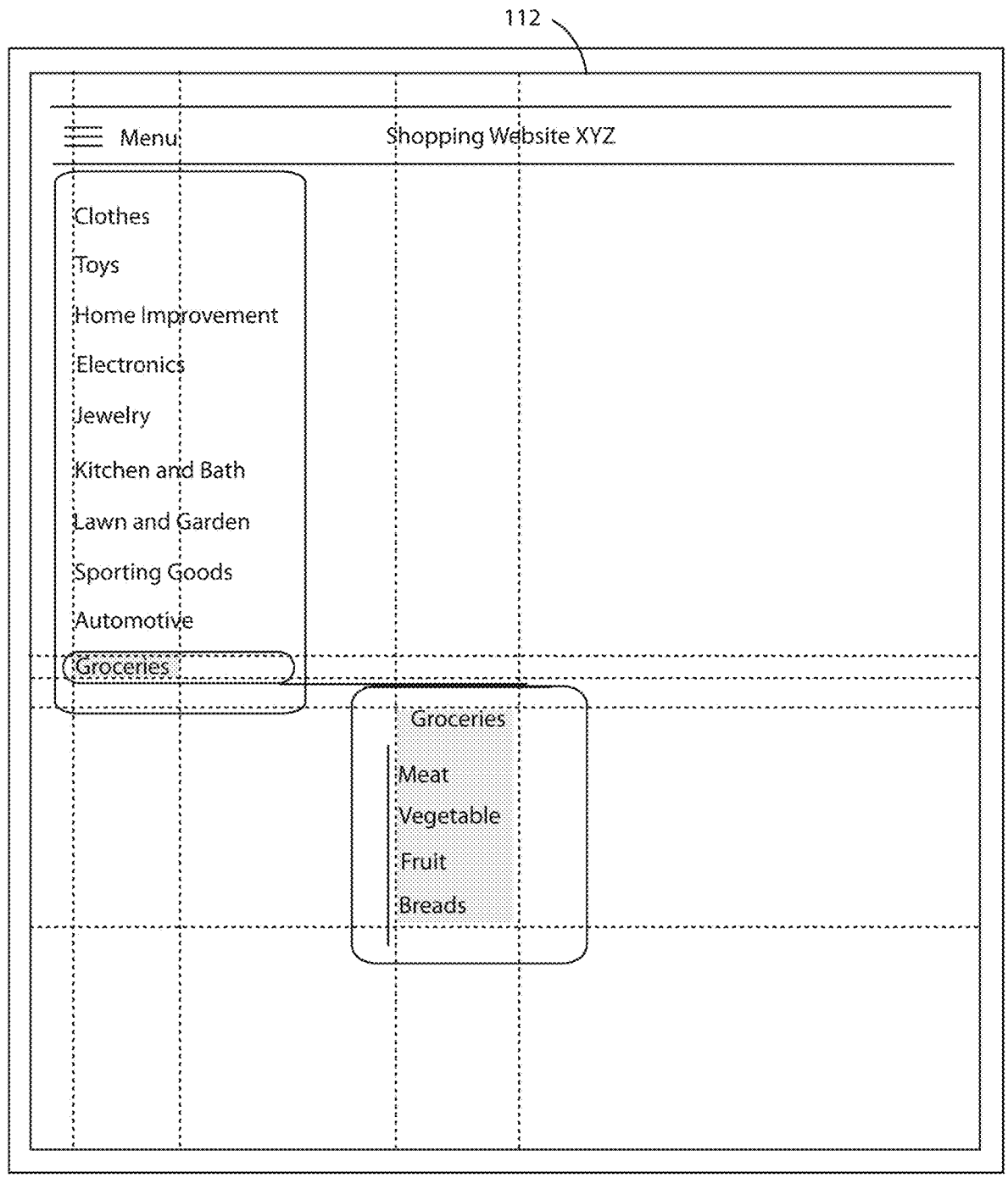
FIG. 6 depicts a detection of default organization of goods on the default appearance of the website of FIG. 2, which are relevant to known user-preferred organization, in accordance with embodiments of the present invention.

Turning now to FIG. 6, which depicts a detection of default organization of goods on the default appearance of the website 112 of FIG. 2, which are relevant to known user-preferred organization, in accordance with embodiments of the present invention. Embodiments of the detection nodule 133 may detect the default terms/layout section by scanning, scraping, or otherwise searching the webpage of the website 112 for text, terms, keywords, descriptors, etc. that may be replaced by user-specific terms. For instance, the detection module 133 may locate or otherwise identify a location or a position of one or more default terms on the webpage. By scanning the webpage, the detection module 133 may determine a precise location or positioning of the default term associated with the default organization/classification being displayed on the webpage of the website 112. In the example depicted by FIG. 6, a positioning of the default term "Groceries" has been identified in two locations, which may be replaceable by the user-preferred term "Food." A positioning of the default terms "Meat," "Vegetable," "Fruit," and "Breads" has been identified at a precise location, which may be replaceable by the user-preferred terms "Breakfast," "Lunch," "Dinner," and "Dessert." In an exemplary embodiment, the location of the default term(s) as they exist on the website 112 can be stored as a path. For example, the detection module 133 may then determine a directory and eventually a path name associated with the default term being displayed, at that location on the website 112. The paths may be a CSS path or X path. The path name may then be stored as the path for each detected default term, which allows a masking tool or superimposing tool to know the precise location where masking and/or superimposing of text may occur on the particular website 112. The path may be stored locally on the computing system 120 or may be stored on a remote server or other computer readable storage device coupled to the computing system 120.

Figure 7:
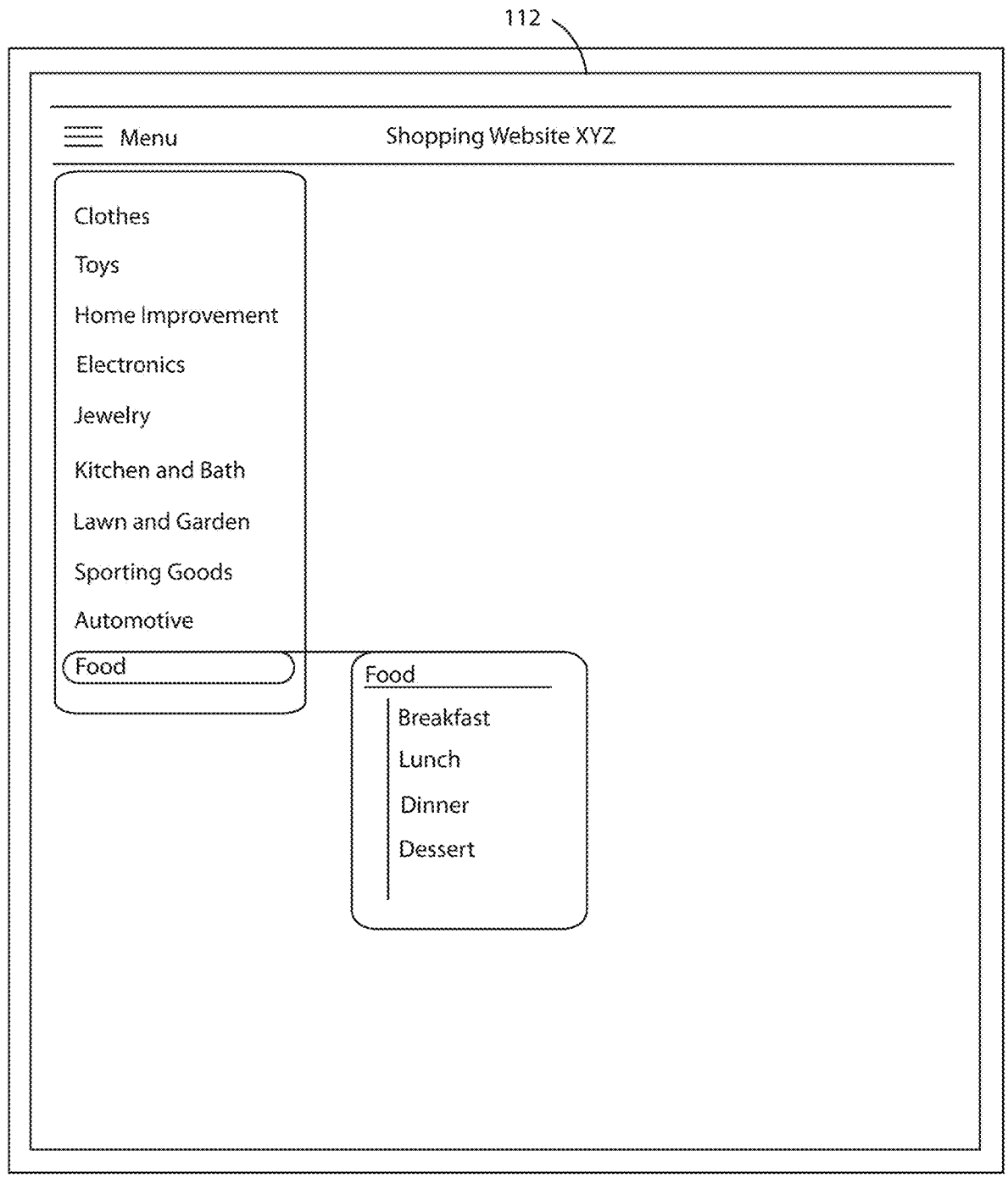
FIG. 7 depicts a personalized appearance of the website of FIG. 5, in accordance with embodiments of the present invention.

FIG. 7 depicts a personalized appearance of the website of FIG. 5, in accordance with embodiments of the present invention. Embodiments of the personalized appearance of the website 112 may be an appearance, layout, presentation, configuration, that displays text referring to a user-preferred layout, order, classification, etc. of various categories of objects, goods, products, services, etc. using terms, descriptors, words, text, etc. that the user prefers, regularly used, easily recognizes and the like, discovered by analyzing the user-specific information gathered from user online activity. The personalized appearance of the website 112 has been changed so the user, when the user accessed the website, sees the user-preferred terms in a manner consistent with a user-preferred layout, and not the default terms used to order a set of goods. In FIG. 7, the website 112 has been altered such that the submenu bar of website 112 is organized, presented, ordered, etc. in a manner consistent with the user-preferred organization of food/groceries (e.g. based on the posting recipes based on the type of meal and using the shopping list software application to create shopping list by type of meal). The new webpage, due to the website modification module 134, includes a user-preferred term "food" to head the category, with the submenu being organized with the terms "Breakfast" instead of "Meat, "Lunch" instead of "Vegetable", "Dinner" instead of "Fruit," and "Dessert" instead of "Breads." Thus, the website 112 is custom modified only for the individualized user, wherein actual displayed text is unique to the individual user. Embodiments of the computing system 120 may continuously monitor the online user activity to further learn and develop new user-preferred terms.

Various tasks and specific functions of the modules of the computing system 120 may be performed by additional modules, or may be combined into other module(s) to reduce the number of modules. Further, embodiments of the computer or computer system 120 may comprise specialized, non-generic hardware and circuitry (i.e., specialized discrete non-generic analog, digital, and logic-based circuitry) (independently or in combination) particularized for executing only methods of the present invention. The specialized discrete non-generic analog, digital, and logic-based circuitry may include proprietary specially designed components (e.g., a specialized integrated circuit, such as for example an Application Specific Integrated Circuit (ASIC), designed for only implementing methods of the present invention). Moreover, embodiments of the website personalization system 100 changes an appearance of a website using a website modification application 130. The website personalization system 100 may individualize a website to each user/user device based on the user's online activity. For instance, with the website personalization system 100, each user has a unique and different experience with a website, wherein the website is altered for each user, but remains unchanged for other users. The website personalization system 100 may superimpose text to change the appearance of the website to have a completely different menu look and feel, without needing to program the entire website.

Furthermore, the website personalization system 100 improves and advances website modification and customization technology by bypassing intensive coding and programming efforts to alter a website. Without altering the website, the menus, layouts, text, etc. on the website can be overwhelming to the user, and to alter the default website to load in a certain way for each individual accessing the website would require a massive programming effort. Embodiments of the website personalization system 100 provides a technical solution to the above-drawbacks by altering the appearance of the website using various webtools, such as a locator tool, masking tool, a superimposing tool. The technical solution(s) described herein is necessarily rooted in computer technology in order to overcome a problem specifically arising in the realm of website customization. For instance, instead of a user needing to navigate a default website that has no customization when it comes to text and organization, the website personalization system 100 dynamically adjusts the website text and organization to tailor the website experience to the individual.

Figure 8:
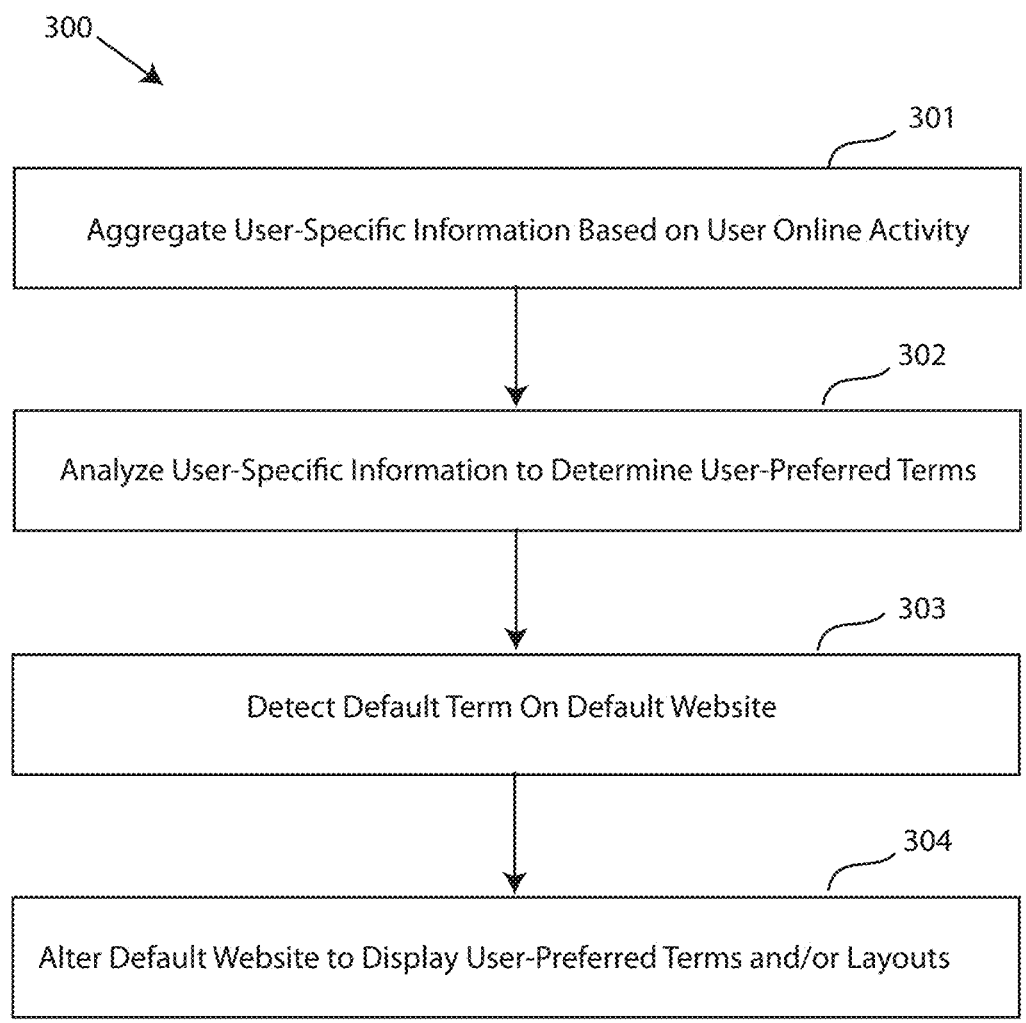
FIG. 8 depicts a flow chart of a method for altering a website from a default appearance to a personalized appearance, in accordance with embodiments of the present invention.

Referring now to FIG. 8, which depicts a flow chart of a method 300 for altering a website from a default appearance to a personalized appearance, in accordance with embodiments of the present invention. One embodiment of a method 300 or algorithm that may be implemented for altering a website from a default appearance to a personalized appearance with the website personalization system 100 described in FIGS. 1-7 using one or more computer systems as defined generically in FIG. 9 below, and more specifically by the specific embodiments of FIG. 1.

Embodiments of the method 300 for altering a website from a default appearance to a personalized appearance, in accordance with embodiments of the present invention, may begin at step 301 wherein user-specific information based on user online activity is aggregated. Step 302 analyzes the user-specific information to determine user-preferred terms. Step 303 detects default term(s) on a default appearance of a webpage. Step 304 alters the default website to display user-preferred terms and/or layouts.

Figure 9:
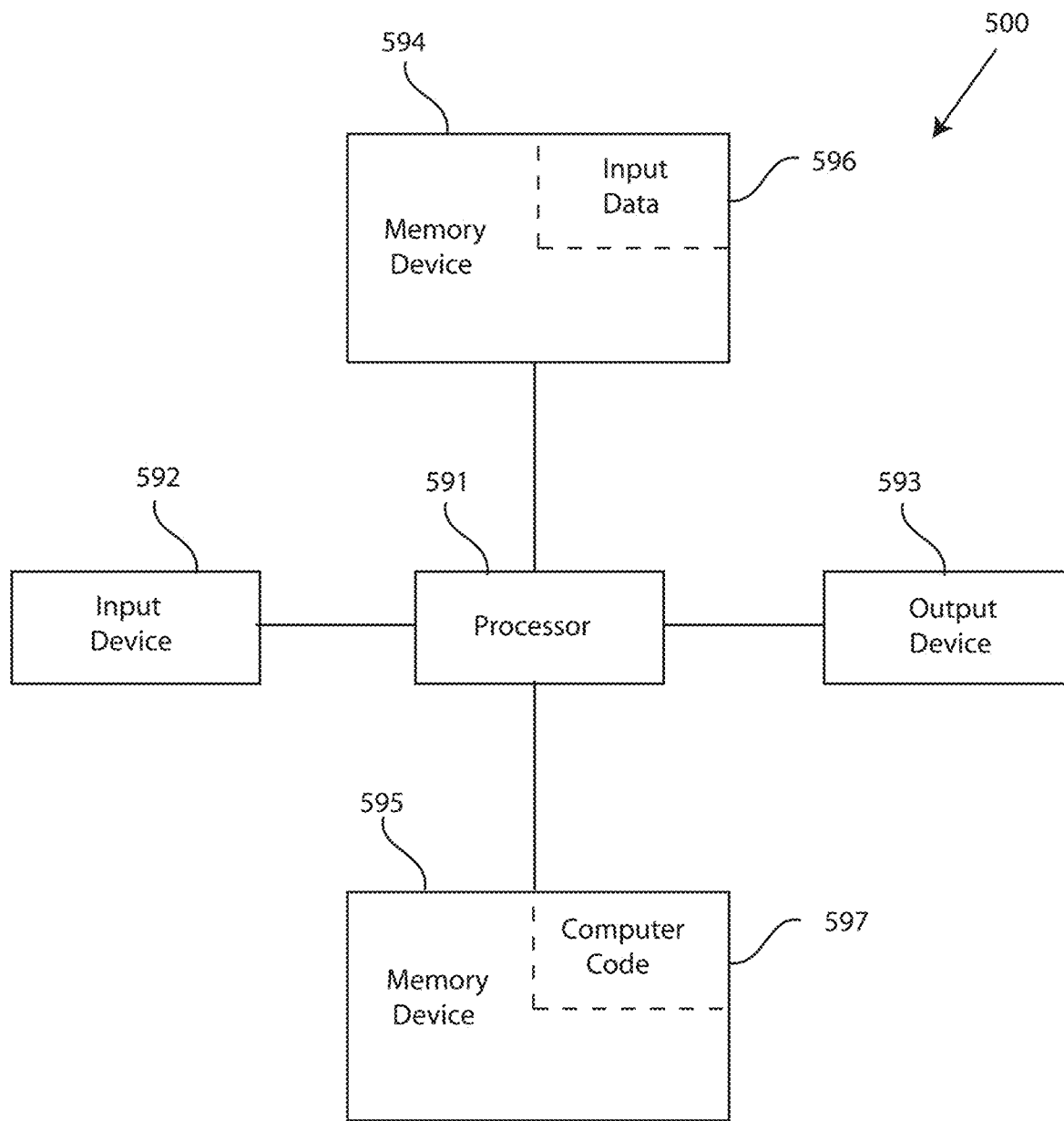
FIG. 9 depicts a block diagram of a computer system for the website personalization system of FIGS. 1-7, capable of implementing methods for altering a website from a default appearance to a personalized appearance of FIG. 8, in accordance with embodiments of the present invention.

FIG. 9 depicts a block diagram of a computer system for the website personalization 100 of FIGS. 1-7, capable of implementing methods for altering a website from a default appearance to a personalized appearance of FIG. 8, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer system 500, including executing instructions included in the computer code 597 for the tools and programs capable of implementing a method for altering a website from a default appearance to a personalized appearance in the manner prescribed by the embodiments of FIG. 8 using the website personalization system 100 of FIGS. 1-7, wherein the instructions of the computer code 597 may be executed by processor 591 via memory device 595. The computer code 597 may include software or program instructions that may implement one or more algorithms for implementing the method for altering a website from a default appearance to a personalized appearance, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer-readable program embodied therein and/or having other data stored therein, wherein the computer-readable program comprises the computer code 597. Generally, a computer program product (or, alternatively, an article of manufacture) of the computer system 500 may comprise said computer usable storage medium (or said program storage device).

Memory devices 594, 595 include any known computer-readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (TAN) or a wide area network (WAN). Further, memory devices 594, 595 may include an operating system (not shown) and may include other systems not shown in FIG. 9.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. or in some embodiments the touchscreen of a computing device. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 125 as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to website personalization and customization systems and methods. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer system 500) including one or more processor(s) 591, wherein the processor(s) carry out instructions contained in the computer code 597 causing the computer system alter a website from a default appearance to a personalized appearance. Another embodiment discloses a process for supporting computer infrastructure, where the process includes integrating computer-readable program code into a computer system 500 including a processor.

The step of integrating includes storing the program code in a computer-readable storage device of the computer system 500 through use of the processor. The program code, upon being executed by the processor, implements a method for altering a website from a default appearance to a personalized appearance. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for altering a website from a default appearance to a personalized appearance.

A computer program product of the present invention comprises one or more computer-readable hardware storage devices having computer-readable program code stored therein, said program code containing instructions executable by one or more processors of a computer system to implement the methods of the present invention.

A computer system of the present invention comprises one or more processors, one or more memories, and one or more computer-readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models areas Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
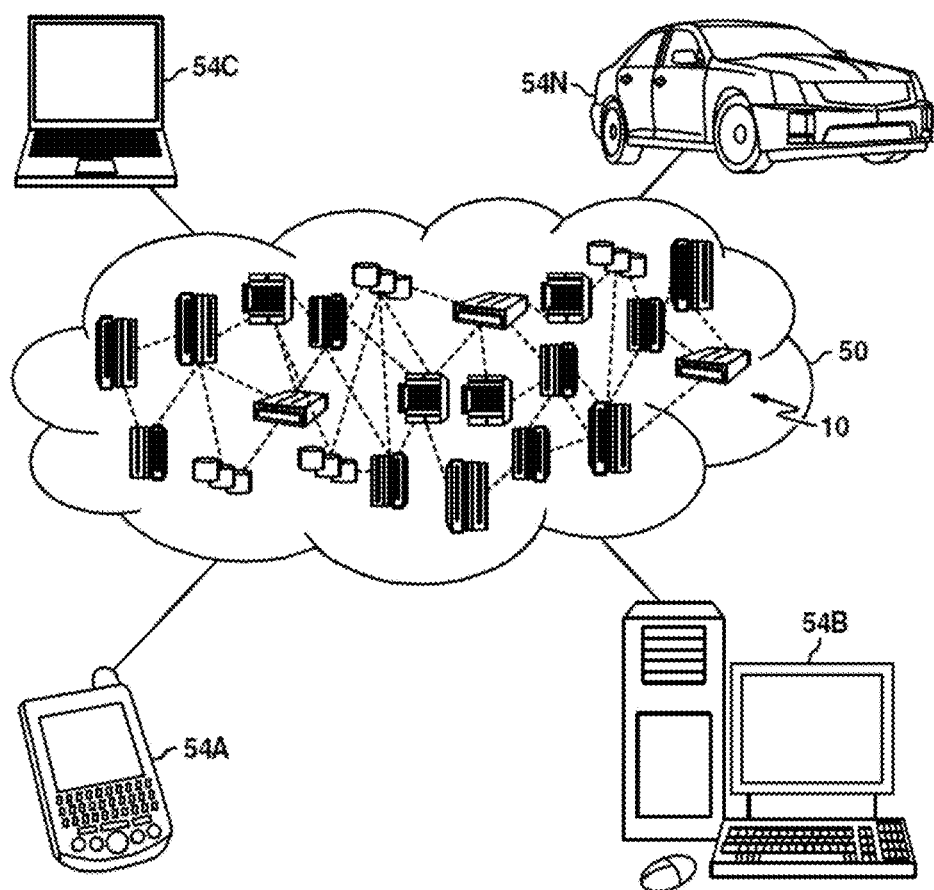
FIG. 10 depicts a cloud computing environment, in accordance with embodiments of the present invention.

Referring now to FIG. 10, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 12 are intended to be illustrative only and that computing nodes 10 and cloud computing environment 50 can communicate with any type of computerized device over any type of network and/or network addressable connection (e.g., using a web browser).

Figure 11:
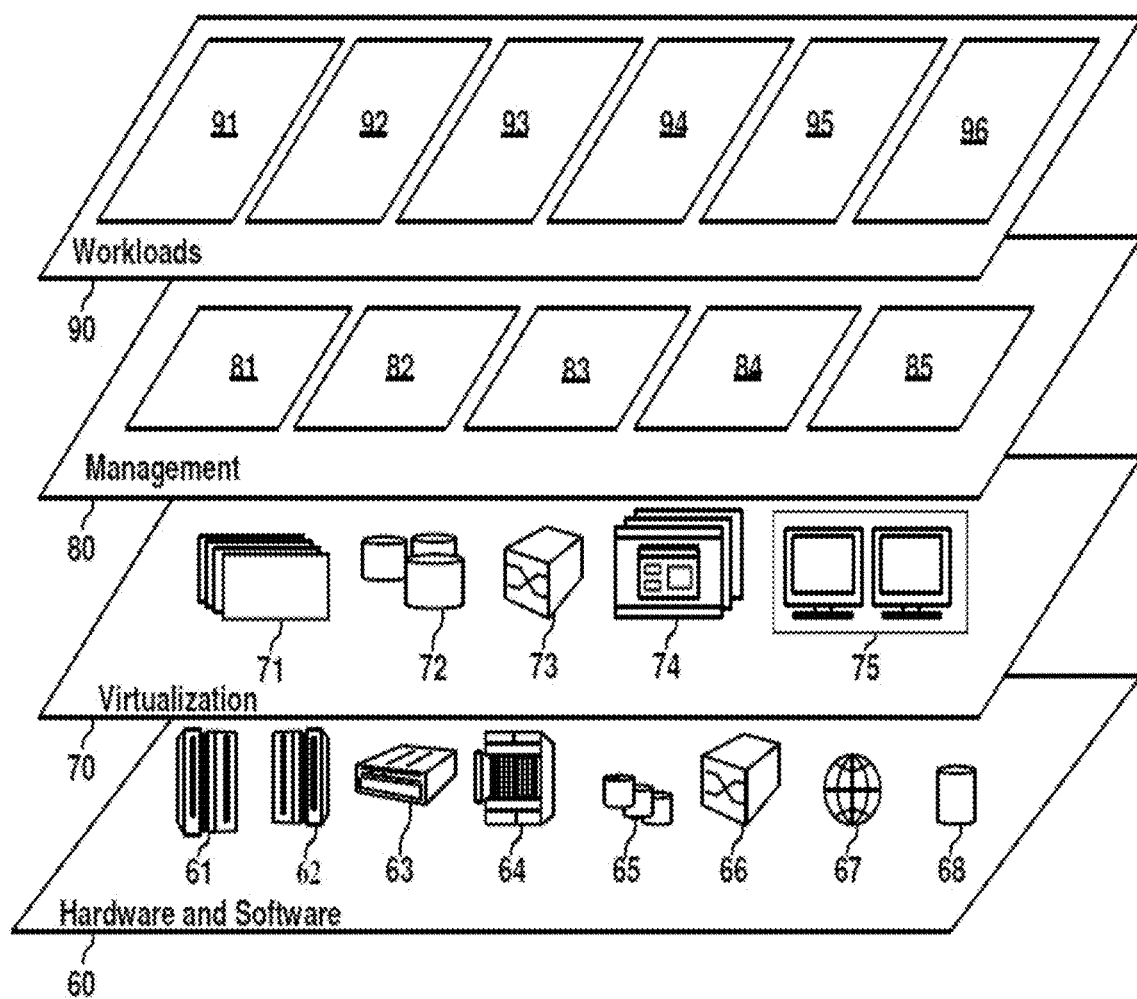
FIG. 11 depicts abstraction model layers, in accordance with embodiments of the present invention.

Referring now to FIG. 11, a set of functional abstraction layers provided by cloud computing environment 50 (see FIG. 10) are shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and website modification and customization 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein

What is claimed is:

1. A method for altering an e-commerce website from a generally available default appearance to a user-specific appearance, the method comprising:

aggregating, by a processor of a computing system, user-specific information based on an online user activity across a plurality of platforms, wherein the online user activity includes a browsing history, a shopping history, an email history, a social media activity on one or more social media platforms, and a software application interaction;

analyzing, by the processor, the aggregated user-specific information based on the online user activity to determine a user-preferred term for describing a category of an object;

analyzing, by the processor, content displayed on the generally available default appearance of the e-commerce website, in response to a determination that a user has accessed the e-commerce website;

detecting, by the processor, a presence and location of a default term used to describe the category of the object on the generally available default appearance of the e-commerce website; and altering, by the processor, the generally available default appearance of the e-commerce website to the user-specific appearance of the e-commerce website for display to the user, by superimposing the user-preferred term at the location of the default term on the generally available default appearance of the e-commerce website;

wherein the user-specific appearance of the e-commerce website provides a personalized e-commerce portal specific to the user allowing the user to visit the e-commerce website and locate and purchase the object based on the user-preferred term instead of the default term for the category of the object, wherein the user-preferred term refers to a same category of object as the default term.

2. The method of claim 1, wherein the plurality of platforms includes shopping websites, text messaging applications, social media platforms, browser bookmarks, a virtual assistant, a dictation application, and email applications.

3. The method of claim 1, wherein the superimposing includes masking, by the processor, the default term at the location of the default term on the generally available default appearance of the e-commerce website, and overlaying, by the processor, the user-preferred term onto the masked location to provide the user-specific appearance of the e-commerce website, so that the user only sees the user-preferred teen at the masked location.

4. The method of claim 1, wherein the online user activity is continuously updated to determine new user-preferred terms for new categories of objects.

5. The method of claim 1, wherein the detecting includes scraping, by the processor, the website for keywords that are relevant to the user-preferred term, and storing, by the processor, the location of the default term on the generally available default appearance of the e-commerce website when a relevant keyword is located.

6. The method of claim 1, wherein the determining the user-preferred term includes applying, by the processor, a machine learning technique to the aggregated user-specific information to learn how the user describes at least one of the category and the object.

7. A computing system, comprising:
a processor;
a memory device coupled to the processor; and
a computer readable storage device coupled to the processor, wherein the storage device contains program code executable by the processor via the memory device to implement a method for altering an e-commerce website from a generally available default appearance to a user-specific appearance, the method comprising:

aggregating, by a processor of a computing system, user-specific information based on an online user activity across a plurality of platforms, wherein the online user activity includes a browsing history, a shopping history, an email history, a social media activity on one or more social media platforms, and a software application interaction;

analyzing, by the processor, the aggregated user-specific information based on the online user activity to determine a user-preferred term for describing a category of an object;

analyzing, by the processor, content displayed on the generally available default appearance of the e-commerce website, in response to a determination that a user has accessed the e-commerce website;

detecting, by the processor, a presence and location of a default term used to describe the category of the object on the generally available default appearance of the e-commerce website; and altering, by the processor, the generally available default appearance of the e-commerce website to the user-specific appearance of the e-commerce website for display to the user, by superimposing the user-preferred term at the location of the default term on the generally available default appearance of the e-commerce website;

wherein the user-specific appearance of the e-commerce website provides a personalized e-commerce portal specific to the user allowing the user to visit the e-commerce website and locate and purchase the object based on the user-preferred term instead of the default term for the category of the object, wherein the user-preferred term refers to a same category of object as the default term.

8. The computing system of claim 7, wherein the plurality of platforms includes shopping websites, text messaging applications, social media platforms, browser bookmarks, a virtual assistant, a dictation application, and email applications.

9. The computing system of claim 7, wherein the superimposing includes masking, by the processor, the default term at the location of the default term on the generally available default appearance of the e-commerce website, and overlaying, by, the processor, the user-preferred term onto the masked location to provide the user-specific appearance of the e-commerce website, so that the user only sees the user-preferred term at the masked location.

10. The computing system of claim 7, wherein the online user activity is continuously updated to determine new user-preferred terms for new categories of objects.

11. The computing system of claim 7, wherein the detecting includes scraping, by the processor, the website for keywords that are relevant to the user-preferred term, and storing, by the processor, the location of the default term on the generally available default appearance of the e-commerce website when a relevant keyword is located.

12. The computing system of claim 7, wherein the determining the user-preferred term includes applying, by the processor, a machine learning technique to the aggregated user-specific information to learn how the user describes at least one of the category and the object.

13. A computer program product, comprising a computer readable hardware storage device storing a computer readable program code, the computer readable program code comprising an algorithm that when executed by a computer processor of a computing system implements a method for altering an e-commerce website from a generally available default appearance to a user-specific appearance, the method comprising:

aggregating, by a processor of a computing system user-specific information based on an online user activity across a plurality of platforms, wherein the online user activity includes a browsing history, a shopping history, an email history, a social media activity on one or more social media platforms, and a software application interaction;

analyzing, by the processor, the aggregated user-specific information based on the online user activity to determine a user-preferred term for describing a category of an object;

analyzing, by the processor, content displayed on the generally available default appearance of the e-commerce website, in response to a determination that a user has accessed the e-commerce website;

detecting, by the processor, a presence and location of a default term used to describe the category of the object on the generally available default appearance of the e-commerce website; and altering, by the processor, the generally available default appearance of the e-commerce website to the user-specific appearance of the e-commerce website for display to the user, by superimposing the user-preferred term at the location of the default term on the generally available default appearance of the e-commerce website;

wherein the user-specific appearance of the e-commerce website provides a personalized e-commerce portal specific to the user allowing the user to visit the e-commerce website and locate and purchase the object based on the user-preferred term instead of the default term for the category of the object, wherein the user-preferred term refers to a same category of object as the default term.

14. The computer program product of claim 13, wherein the plurality of platforms includes shopping websites, text messaging applications, social media platforms, browser bookmarks, a virtual assistant, a dictation application, and email applications.

15. The computer program product of claim 13, wherein the superimposing includes masking, by the processor, the default term at the location of the default term on the generally available default appearance of the e-commerce website, and overlaying, by the processor, the user-preferred term onto the masked location to provide the user-specific appearance of the e-commerce website, so that the user only, sees the user-preferred term at the masked location.

16. The computer program product of claim 13, wherein the online user activity is continuously updated to determine new user-preferred terms for new categories of objects.

17. The computer program product of claim 13, wherein the detecting includes scraping, by the processor, the website for keywords that are relevant to the user-preferred term, and storing, by the processor, the location of the default term on the generally available default appearance of the e-commerce website when a relevant keyword is located.

* * * * *